(12) United States Patent
Shutty

(10) Patent No.: US 6,321,142 B1
(45) Date of Patent: Nov. 20, 2001

(54) SYSTEM FOR PROGRAMMING A VEHICLE CONTROL COMPUTER WITH SELECTABLE FEATURES AND/OR TRIM VALUES

(75) Inventor: John V. Shutty, Columbus, IN (US)

(73) Assignee: Cummins Engine Company, Inc., Columbus, IN (US)

(*) Notice: Subject to any disclaimer, the term of this patent is extended or adjusted under 35 U.S.C. 154(b) by 0 days.

(21) Appl. No.: 09/571,233

(22) Filed: May 16, 2000

(51) Int. Cl.7 .............................. G06F 17/00; G06F 7/00
(52) U.S. Cl. .................................. 701/1; 701/36; 701/29; 701/24; 340/825.31
(58) Field of Search .................................. 701/1, 36, 24, 701/29; 340/825.31

(56) References Cited

U.S. PATENT DOCUMENTS

| | | |
|---|---|---|
| 5,091,858 | 2/1992 | Paielli ............................ 364/431.12 |
| 5,214,582 | 5/1993 | Gray ............................... 364/424.03 |
| 5,365,436 | 11/1994 | Schaller et al. . |
| 5,426,585 | 6/1995 | Stepper et al. . |
| 5,724,242 | 3/1998 | Moore-McKee et al. ....... 364/431.04 |
| 5,729,452 * | 3/1998 | Smith et al. ............................ 701/29 |
| 5,771,354 | 6/1998 | Crawford ......................... 395/200.59 |
| 5,787,367 | 7/1998 | Berra ........................................ 701/1 |
| 5,815,071 | 9/1998 | Doyle ..................................... 340/439 |
| 5,835,871 * | 11/1998 | Smith et al. ............................ 701/29 |
| 5,890,080 | 3/1999 | Coverdill et al. ....................... 701/29 |
| 5,941,933 | 8/1999 | Miyake et al. . |
| 5,961,561 | 10/1999 | Wakefield, II ........................ 701/29 |
| 6,032,089 | 2/2000 | Buckley ................................. 701/36 |
| 6,032,149 | 2/2000 | Kendall et al. . |
| 6,044,014 | 3/2000 | Komori et al. . |
| 6,094,618 | 7/2000 | Harada . |
| 6,154,658 * | 11/2000 | Caci .................................... 455/466 |

* cited by examiner

Primary Examiner—William A. Cuchlinski, Jr.
Assistant Examiner—Olga Hernandez
(74) Attorney, Agent, or Firm—Barnes & Thornburg (57) ABSTRACT

A system for programming a vehicle control computer with selectable features and/or trim values includes a first computer maintaining a web site containing vehicle control computer calibration information and a second computer operable to access the web site whereby the first computer is responsive to information provided by a user to generate a set of feature and/or trim values and to create a file of the set of feature and/or trim values along with a loading program therefore. In one embodiment, the file and loading program may be loaded onto a memory disk for subsequent transfer to a third computer configured for communicating with a vehicle control computer. In another embodiment, the file and loading program may be transferred directly to the third computer via a wired or wireless communications link. In still another embodiment, the third computer may access the web site and the file and loading program may accordingly be transferred directly to the third computer from the web site. In still a further embodiment, the loading program may be resident within, or provided by an external source, to the third computer so that transfer of only the file thereto is necessary. In any case, the file of feature and/or trim values is loaded onto the vehicle control computer by the third computer according to the loading program.

20 Claims, 10 Drawing Sheets

SYSTEM FOR PROGRAMMING A VEHICLE CONTROL COMPUTER WITH SELECTABLE FEATURES AND/OR TRIM VALUES

FIELD OF THE INVENTION

The present invention relates generally to systems for programming a vehicle control computer, and more specifically to systems for automatically generating a set of vehicle/engine feature and/or trim values based on customer input for downloading into the vehicle control computer.

BACKGROUND OF THE INVENTION

Systems for calibrating embedded vehicle control computers are known and widely used in the automotive and trucking industries. It is commonplace for vehicle control computers to be programmed by the engine manufacturer with a so-called base calibration, wherein certain features thereof may be enabled or disabled via appropriate computer control. As one example, the base calibration may include one or more software algorithms for executing a vehicle speed signal tampering feature, wherein this feature may be selectively enabled or disabled as desired by an appropriate programming tool. Additionally, the base calibration typically includes a number of operational parameters that may be adjusted or trimmed within a range of permissible values via the programming tool. For example, the base calibration may include a maximum road speed parameter that may be adjustable in one or more mph increments.

In any case, vehicle owners and others typically do not have access to calibration databases, nor do they typically have the training necessary to change feature and/or trimmable parameter values. Consequently, sales personnel of vehicles carrying such vehicle control computers are usually called upon by the vehicle owner-operators to change features and/or trim values when desired. Unfortunately, this service provided by such sales personnel consumes a great deal of their time, wherein such time could be better spent concentrating on sales activities and the like.

What is therefore needed is an easy-to-use system that allows owners, sales persons and others to easily change or update features and/or trim values forming part of a vehicle control computer calibration.

SUMMARY OF THE INVENTION

The foregoing shortcomings of the prior art are addressed by the present invention. In accordance with one aspect of the present invention, a method of programming a vehicle control computer, comprises the steps of accessing a web site containing vehicle control computer calibration information, generating a set of vehicle control computer data based on user input to the web site, and loading the set of vehicle control computer data into a vehicle control computer carried by a vehicle.

In accordance with another aspect of the present invention, a method of programming a vehicle control computer comprises the steps of providing a web site containing vehicle control computer calibration information, creating a file of vehicle control computer data based on at least some of the vehicle control computer calibration information contained in the web site, and loading the file of vehicle control computer data into a vehicle control computer carried by a vehicle.

In accordance with a further aspect of the present invention, a system for programming a vehicle control computer comprises a web site containing vehicle control computer information, a first computer including means for accessing the web site, a medium for storing vehicle control computer data, wherein the first computer is operable to access the web site and download a set of the vehicle control computer data from the web site to the medium, the set of vehicle control computer data based on at least some of the vehicle control computer information contained in the web site and on user information provided thereto, and means for loading the set of vehicle control computer data from the medium to a vehicle control computer.

One object of the present invention is to provide a system for allowing owners, sales personnel and others to easily change or update features and/or trim values forming part of a vehicle control computer calibration.

Another object of the present invention is to provide such a system wherein changes to features and/or trim values are generated automatically in response to user input of information.

Still another object of the present invention is to provide such a system wherein the generated sets of feature and/or trim values are provided to the user along with a loading program, whereby the user may easily load such information into the vehicle control computer.

These and other objects of the present invention will become more apparent from the following description of the preferred embodiments.

DESCRIPTION OF THE PREFERRED EMBODIMENT

For the purposes of promoting an understanding of the principles of the invention, reference will now be made to one or more preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 1:
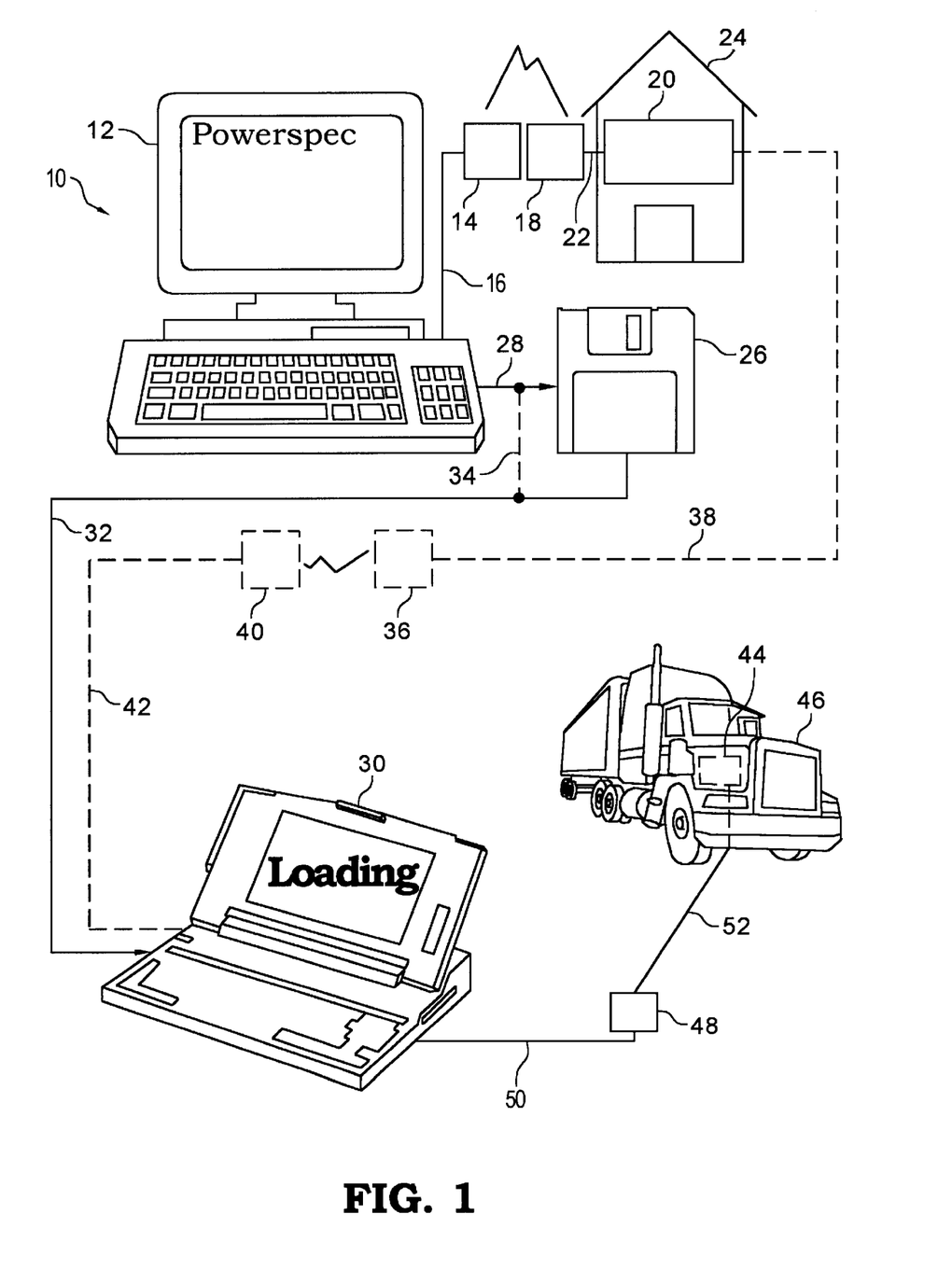
FIG. 1 is a diagrammatic illustration of one preferred embodiment of a system for programming a vehicle control computer with selected features and/or trim values, in accordance with the present invention.

Referring now to FIG. 1, one preferred embodiment of a system 10 for programming a vehicle control computer with selected features and/or trim values, in accordance with the present invention, is shown. System 10 includes a computer 12 connected to a first modem 14 via signal path 16. Computer 12 is preferably a known personal computer (PC) having a keyboard and monitor as shown, although the present invention contemplates that computer 12 may alternatively be any computer having sufficient hardware to operate at least as described hereinafter. In any case, system 10 further includes a second modem 18 connected to a base computer 20 via signal path 22, wherein modems 14 and 18 are preferably telephone modems of known construction. In one embodiment, computer 20 is a mainframe computer operable to manage and maintain a calibration web site, as will be more fully described hereinafter, although the present invention contemplates that computer 20 may alternatively be implemented as a number of servers managed by a single one or more master computer, whereby each of the number of servers is configured for managing external access to the calibration web site as is known in the art. In either case, computer 20 is preferably maintained in a facility 24 remote from computer 12.

Computer 12 is configured to store information obtained from computer 20 on a magnetic memory disk 26 or equivalent information storage medium (e.g., compact disk or "CD") as shown by process arrow 28, whereby information on disk 26 may subsequently be transferred to a portable, or so-called "lap-top" or "notebook", computer 30 of known construction as shown by process arrow 32. Alternatively, computer 12 may be electrically connected directly to computer 30 as shown by connection 34 so that information may be transferred from computer 12 to computer 30 via such a direct electrical connection as is known in the art. In another alternative embodiment, computer 12 and disk 26 may be bypassed altogether by providing a second pair of modems 36 and 40 of known construction, wherein modem 36 is connected to computer 20 via signal path 38 and modem 40 is connected to computer 30 via signal path 42. In this embodiment, computer 30 is operable to receive information directly from computer 20 via modem connection as shown in phantom.

Regardless of any of the foregoing mechanisms by which computer 30 receives information from computer 20, computer 30 is configured to transfer at least some of this information to a vehicle control computer 44 carried by a vehicle 46. In one embodiment, system 10 includes a communications protocol converter 48 having an input connected to a signal output port of computer 30 via signal path 50 and an output connected to a signal input port of vehicle control computer 44 via signal path 52. Signal path 50 is preferably connected to an RS-232 communications port of computer 30 (not shown), whereby signal path 50 is configured to carry information from computer 30 to communications protocol converter 48 in accordance with known RS-232 communications protocol, although the present invention contemplates communicating with converter 48 via other known communication protocols. Signal path 52 preferably defines a known serial data communications link such as a SAE J-1587 or SAE J-1939 data link, whereby converter 48 is operable to convert RS-232 communications protocol to J-1587 or J-1939 communications protocol. Vehicle computer 44 is likewise connected to the serial data communications link so that computer 30 may communicate and transfer information to computer 44 through converter 48 via signal paths 50 and 52. It is to be understood, however, that the present invention contemplates establishing communications and data transfer between computers 30 and 44 via any known means including, but not limited to, direct hardwired connection, wireless communications link, or the like.

From the foregoing, it should now be apparent that system 10 of the present invention is configured to allow access by either computer 12 or computer 30 to a web site maintained by computer 20. The web site maintained by computer 20 is preferably a calibration web site responsive to user input to generate a set of feature and/or trim values for programming the vehicle control computer 44 as will be described in greater detail hereinafter. In one embodiment, a user connects to the calibration web site via computer 12 (e.g., via modems 14 and 18) and downloads the generated set of feature and/or trim values along with a loading program generated by computer 20 to disk 26. The user then loads the contents of the disk 26 into computer 30 and transfers the set of feature and/or trim values to the vehicle control computer 44 according to the loading program. Alternatively, the user may download the generated set of feature and/or trim values from computer 12 directly to computer 30 via wired or wireless connection therebetween. Alternatively still, the user may connect to the calibration web site with computer 30 (e.g., via modems 36 and 40) and download the generated set of feature and/or trim values along with the loading program thereto via the internet connection. In either case, once the set of feature and/or trim values are made available to computer 30, the user transfers the set of feature and/or trim values to the vehicle control computer 44 as described hereinabove.

Figure 2:
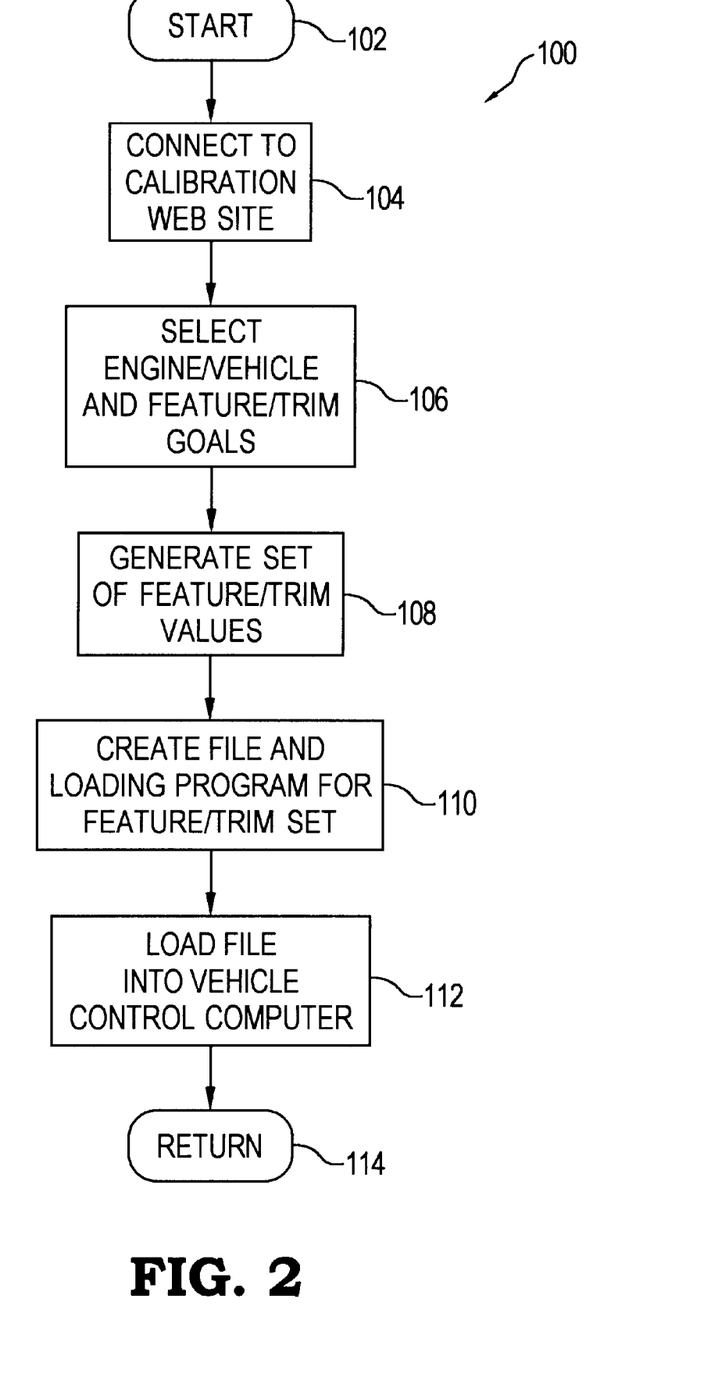
FIG. 2 is a flowchart illustrating one preferred embodiment of a process for programming a vehicle control computer using the system of FIG. 1, in accordance with the present invention.

Referring now to FIG. 2, a flowchart is shown illustrating one preferred embodiment of a process 100 for programming the vehicle control computer 44 using the system of FIG. 1, in accordance with the present invention. Process 100 begins with step 102 and at step 104, a user is operable to connect to a calibration web site maintained by computer 20. As described hereinabove with respect to FIG. 1, either of computers 12 and 30 may be used to make such a connection. Thereafter at step 106, the user is operable to select engine, vehicle, feature and/or trim goals based on information contained in the web site. In one embodiment, for example, the web site is at least partially interactive and includes a questionnaire or instruction set by which the user is guided through selection of the foregoing goals as will be described in greater detail hereinafter. Thereafter at step 108, the computer 20 is responsive to the information provided by the user at step 106 to generate a set of feature and/or trim values. Thereafter at step 110, the user is operable to prompt computer 20 to create a file and loading program for the set of feature and/or trim values generated at step 108. Alternatively, the loading program may be resident within computer 12 or 30, or accessible via an external source, so that computer 20 is operable at step 110 to create only a file for the set of feature and/or trim values. In any case, the user may execute step 110 by prompting computer 20 to download the file of feature and/or trim values to disk 26 for subsequent loading into computer 30. Alternatively, the user may execute step 110 by instructing computer 20 to download the file directly to computer 30 via a wired or wireless communications link. Alternatively still, the user may have executed step 104 by connecting to the web site with computer 30, in which case the user may execute step 110 by instructing computer 20 to download the file of feature and/or trim values directly to computer 30 (e.g., via modems 36 and 40). In any case, once the file of feature and/or trim values is resident within, or accessible by, computer 30, the user is operable at step 112 to download the file of feature and/or trim values into the vehicle control computer 44 according to the loading program. The process 100 returns to some other process, or terminates, thereafter at step 114.

Figure 3:
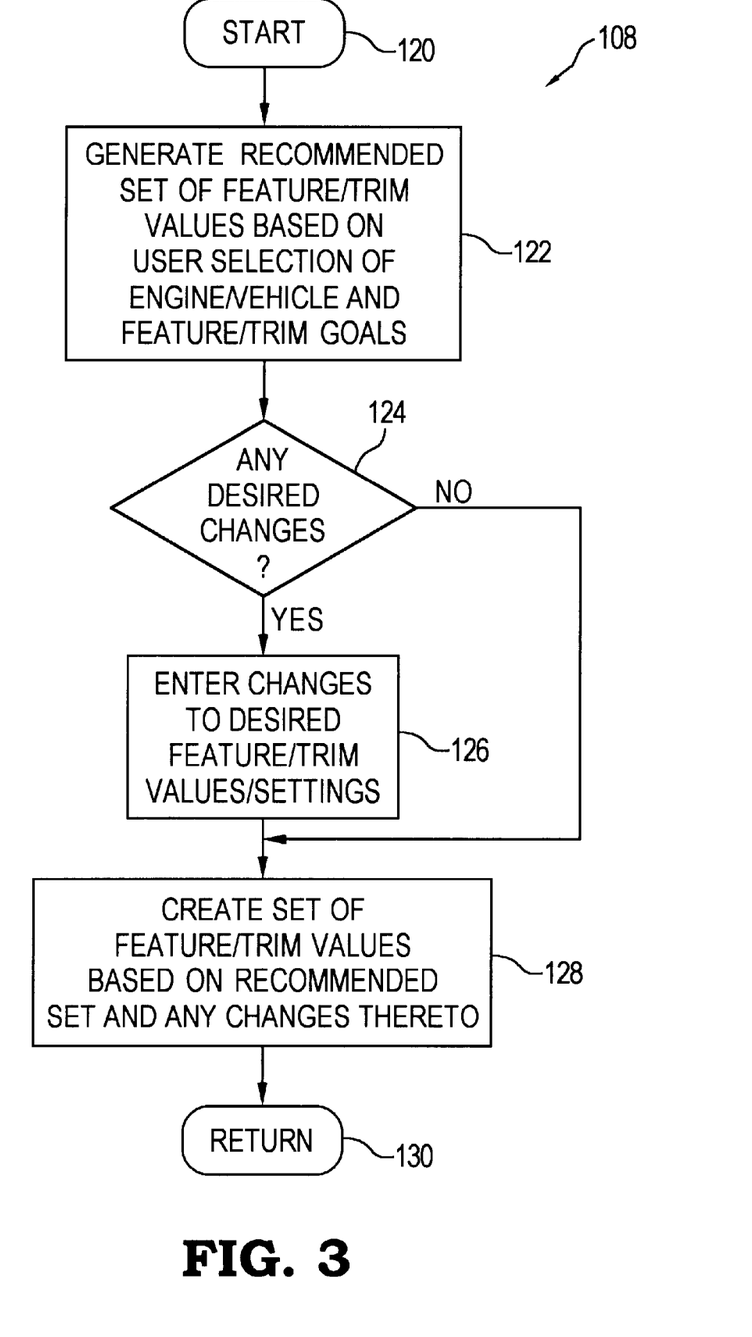
FIG. 3 is a flowchart illustrating one preferred embodiment of at least a portion of a process for generating a set of selected feature and/or trim values in accordance with the present invention.

Referring now to FIG. 3, one preferred embodiment of a process 108 for executing step 108 of the process 100 of FIG. 2, in accordance with the present invention, is shown. Process 108 is preferably embodied as a software algorithm executable by computer 20, and process 108 begins at step 120. Thereafter at step 122, computer 20 is operable to generate a recommended set of feature and/or trim values based on user selection of engine, vehicle, feature and/or trim goals set forth at step 106. Preferably, computer 20 includes a database of available engine types, vehicle applications, feature sets, trim ranges and the like, as well as one or more sets of rules defining appropriate relationships therebetween. Based on information provided by the user at step 106, computer 20 is then operable at step 122 to automatically generate the recommended set according to the contents of the database and preferably according to desired default relationships established by the site administrator.

Once computer 20 has generated a recommended set of feature and/or trim values at step 122, algorithm execution continues at step 124 where computer 20 determines whether the user desires to make any changes or adjustments to the various features and/or trim values within the recommended set. If not, algorithm execution continues at step 128. If, however, computer 20 determines at step 124 that the user wishes to make one or more changes or adjustments to the recommended set of features and/or trim values, algorithm execution continues at step 126 where the user interactively enters changes to desired ones of the features and/or trim values in the recommended set. Accordingly, the user preferably has an opportunity to "fine-tune" the recommended set of feature and/or trim values at step 126 by selecting or deselecting available features and/or by adjusting individual trim values from their recommended settings based on the user's original input selections at step 106.

Algorithm execution continues from step 126, or from the "no" branch of step 124, at step 128 where control computer 120 is operable to create a final set of feature and/or trim values based on the originally recommended set generated at step 122 and any changes made thereto at step 126. Algorithm execution continues from step 126 at step 130 where algorithm 108 is returned to process 100 for creation of the file and loading program corresponding to the final set of feature and/or trim values resulting from step 128.

Referring now to FIG. 4, which is composed of FIGS. 4A–4M, an example of the overall process 100 will now be described with respect to a windows-based calibration web site. It is to be understood that the process illustrated in FIG. 4 provides only one preferred embodiment of process 100, and is not intended to limit the scope of the present invention. In any case, referring to FIG. 4A, a user connecting to the calibration web site first sees a welcome page 200 upon establishing a successful connection. The welcome page 200 preferably provides a brief explanation of the purpose of the calibration web site, and includes selectable icons for exiting the site (Exit) and for continuing through the site (Next). When the Next icon is selected at page 200, page 202 of FIG. 4B appears wherein a user is provided with a list 204 of engine types to choose from. The user selects from list 204 the type of engine sought to be reprogrammed and then selects the Next icon. In the example illustrated, the user has selected the ISX engine type, and the web site advances to page 206 of FIG. 4C where information relating to the ISX engine is displayed. Referring to FIG. 4C, the ISX engine may be implemented in a number of vehicle types, and the user is accordingly provided with lists 208a and 208b identifying possible applications of the selected engine type. The user selects the application that most closely matches that of the engine/vehicle sought to be reprogrammed, and then selects the Next icon. In the example illustrated, the user has selected the "Heavy Hauler" application, and the web site advances to page 208 of FIG. 4D where information relating to the ISX engine in a "Heavy Hauler" application is displayed.

Figure 4A:
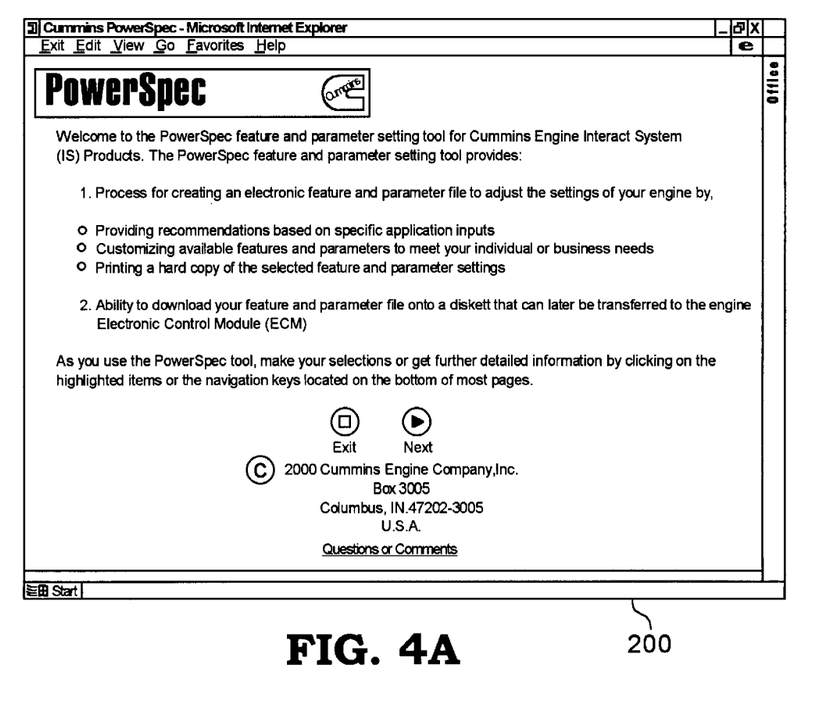
FIG. 4 is composed of FIGS. 4A–4M and illustrates a number of graphic representations of a web-accessible software algorithm for selecting and generating a set of feature and/or trim values, in accordance with the present invention.
Figure 4B:
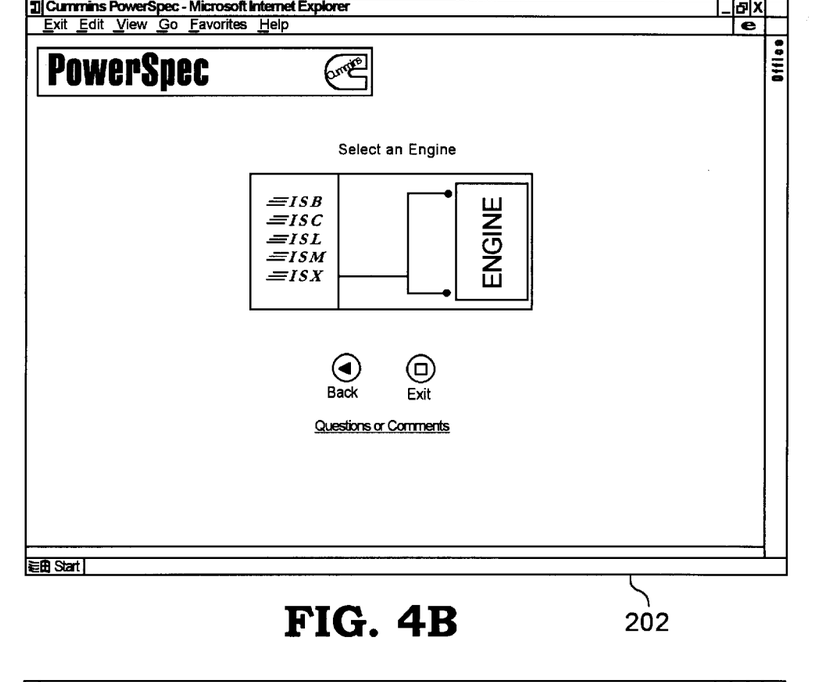
Figure 4C:
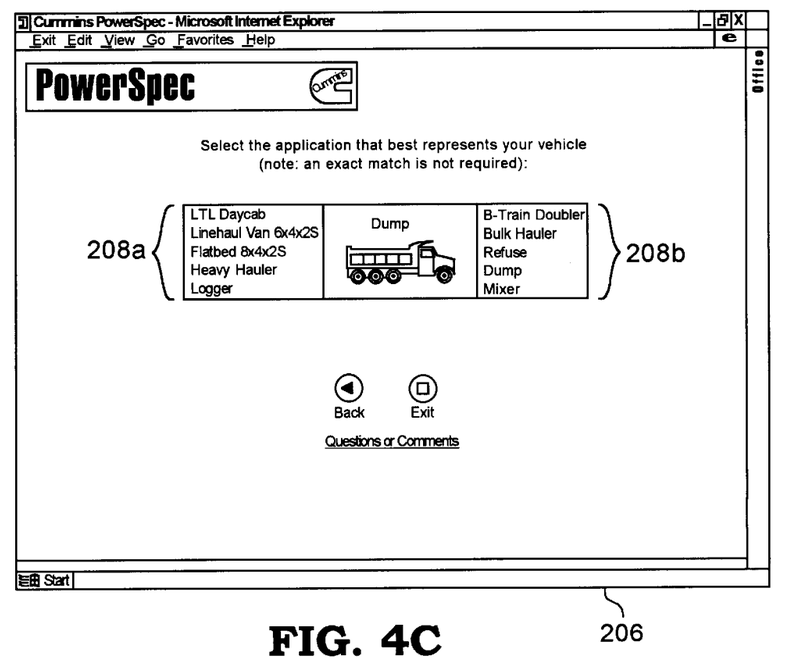
Figure 4D:
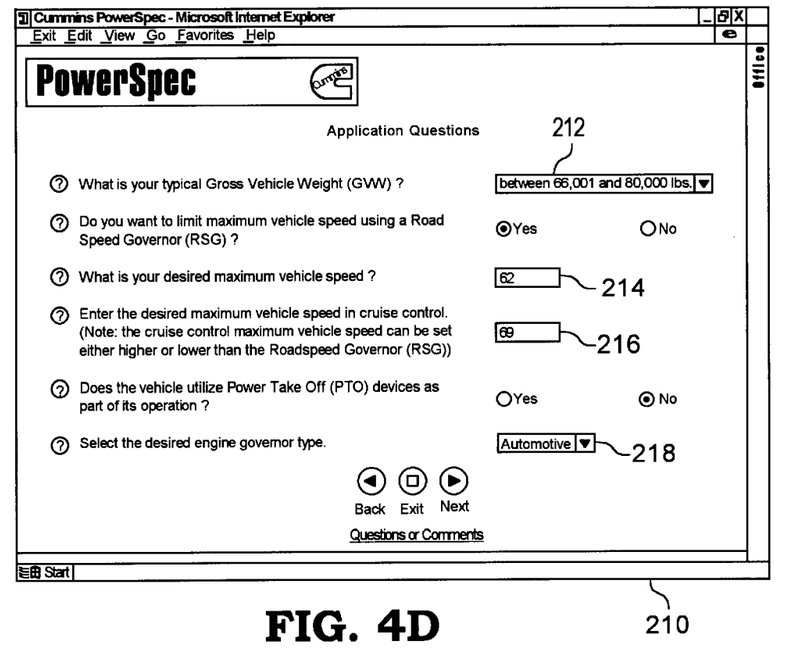

Referring to FIG. 4D, the calibration web site preferably queries the user at page 210 for further information relating to the application as well as one or more performance or feature goals. If the user desires to return to an earlier page, this may be effectuated by selecting the Back icon. In any case, as shown in FIG. 4D, the user enters at window 212 the approximate gross vehicle weight. If the user desires to limit the maximum road speed via a road speed governor, the user may so indicate and enter a desired maximum vehicle speed at window 214 as well as a desired maximum vehicle speed in cruise control mode at window 216. The user is then requested to identify whether the particular application utilizes a power-take-off (PTO) device, and may thereafter select a preferred engine governor type at window 218. With the foregoing information selected and/or entered, the web site advances to page 220 of FIG. 4E.

Figure 4E:
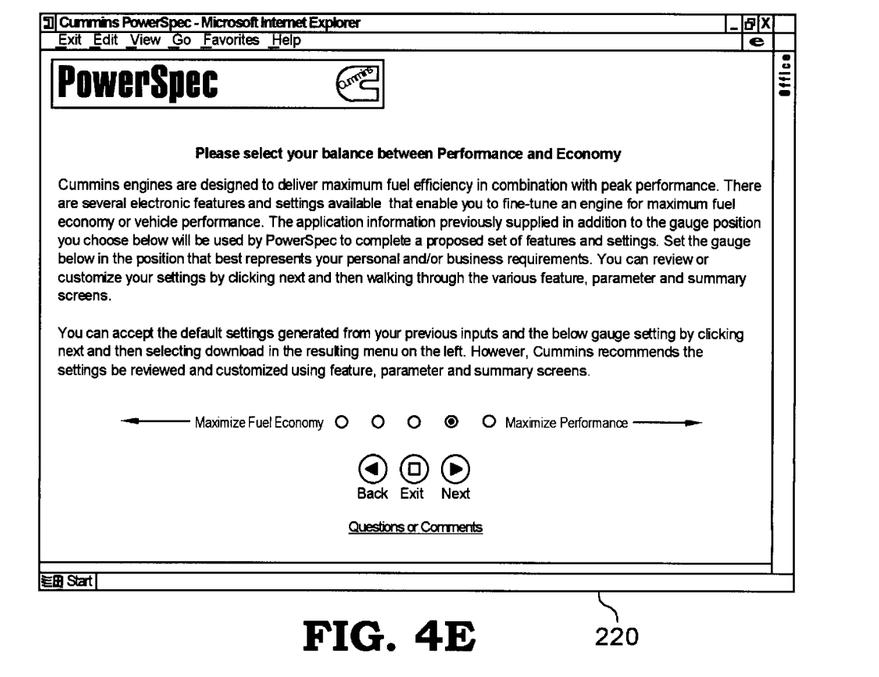
Figure 4F:
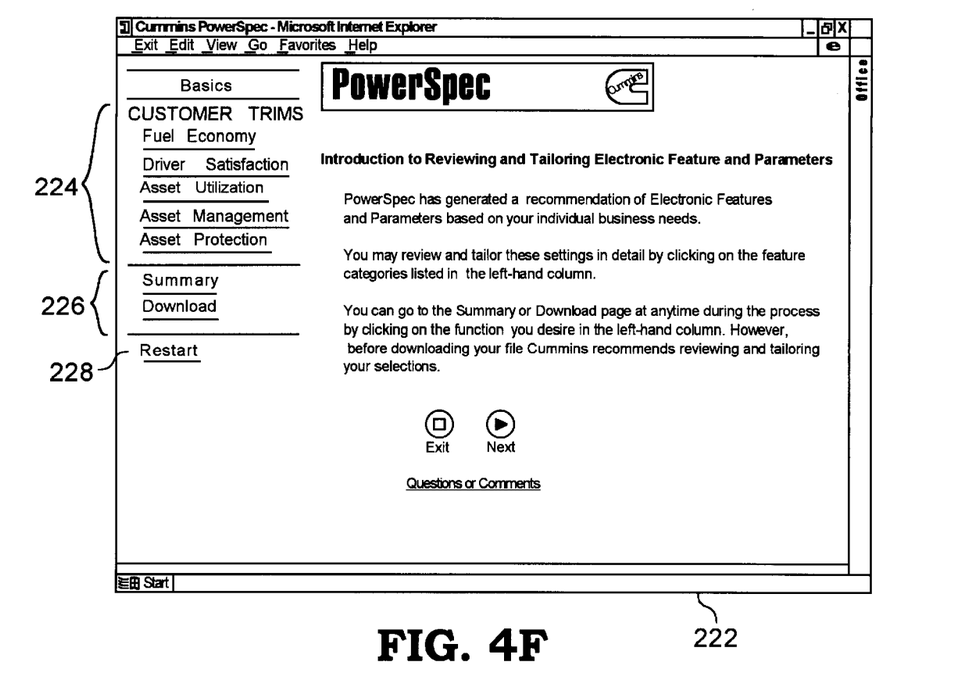

Referring now to FIG. 4E, the calibration web site provides for the ability to tailor the calibration with respect to fuel economy or performance. For example, page 220 provides for five different settings for the resulting recommended set of features and/or trim values, wherein the five different settings range between maximizing fueling economy and maximizing engine performance. The user selects a desired setting from the available five at page 220 and then selects the Next icon. The web site then advances to page 222 of FIG. 4F where computer 20, based on information provided thereto in the pages illustrated in FIGS. 4B–4E, automatically generates a recommended set of features and/or trim values. A category 224 of reviewable trim values is provided on the left side of page 22 along with summary and download options 226 as well a Restart option 228 that allows the user to decline the set of feature and/or trim values and restart the process at page 200. With the recommended set of features and/or trim values established, the user may select the Next icon to review the customer trims of category 224 in the order listed, or may instead select any one of the customer trim options listed in category 224 for immediate viewing thereof. In the example illustrated, the user has selected the Next icon, and the web site advances to page 230 of FIG. 4G wherein information relating to the fuel economy feature of the recommended set of feature and/or trim values is displayed. In one preferred embodiment of page 230, the user is presented with a list of selected features and a list of unselected features. The list of unselected features are preferably features that are available but that were not recommended by the calibration web site for inclusion in the set of features and/or trim values. The user has the option at page 230 to select any one or more of the features listed on page 230 as unselected. In response, the calibration web site is operable to advance to appropriate pages (not shown) to allow for inclusion of any such features in the recommended set. The user is also presented with a list of currently selected features, and the user may select any one or more of the currently selected features for review thereof. In this example, the user has selected the Road Speed Governor feature, and the calibration web site advances to page 232 of FIG. 4H where the recommended trim values for the Road Speed Governor feature are displayed for user review and/or change.

Figure 4G:
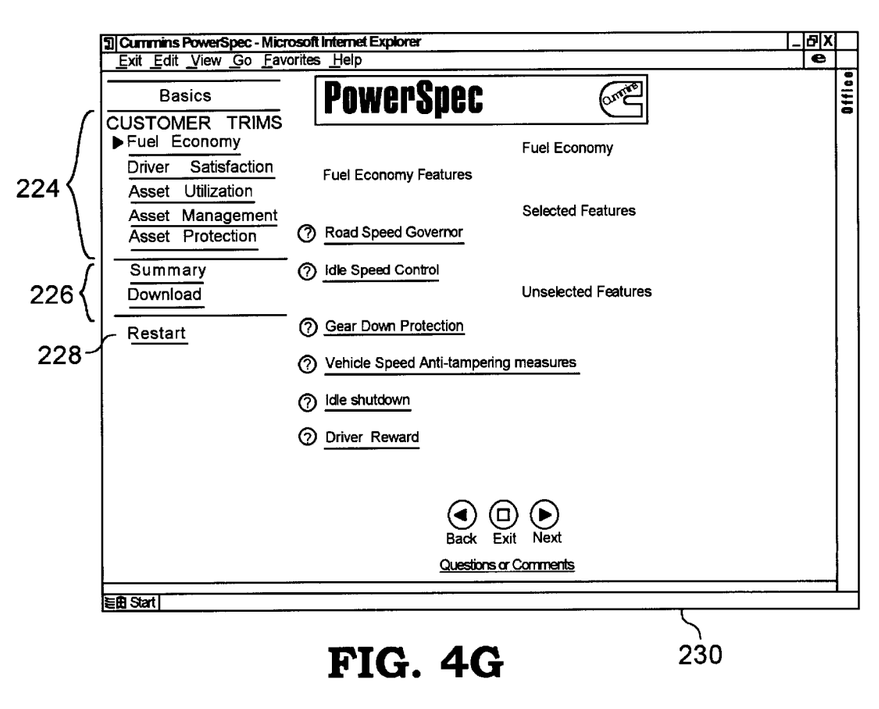
Figure 4H:
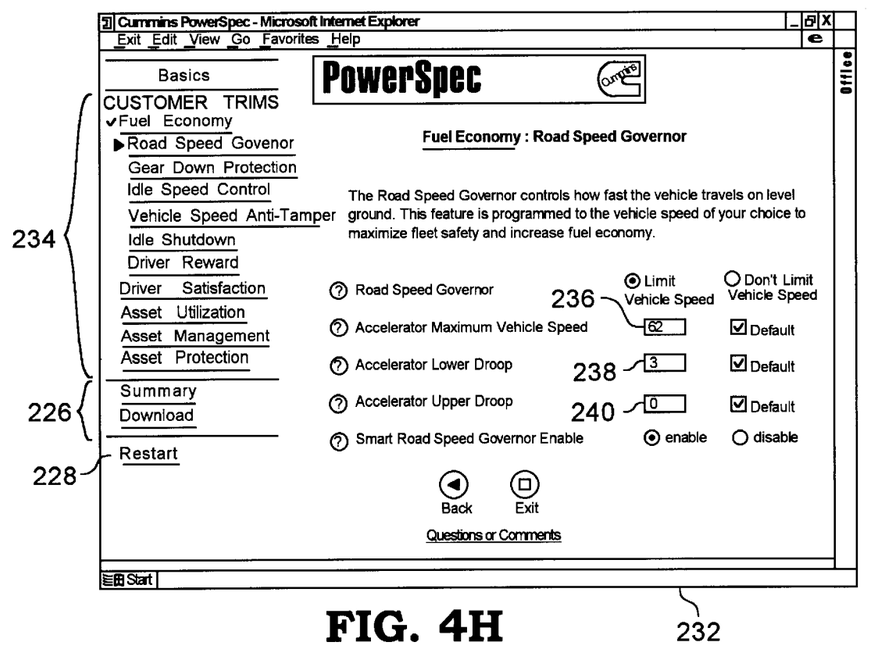
Figure 4I:
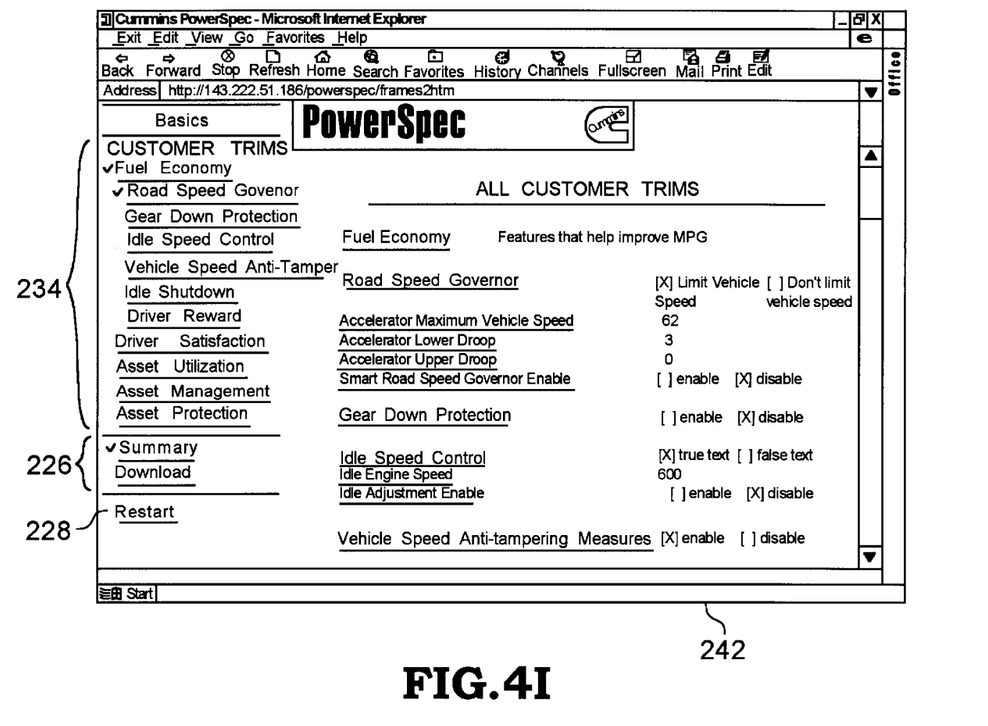

Referring now to FIG. 4H, the user may select or deselect the Road Speed Governor feature and/or change any of the Road Speed Governor settings from their recommended settings, and preferably within predefined ranges therefore. In the example shown, the calibration web site has recommended limiting vehicle speed (i.e., activating the Road Speed Governor feature) based on user information provided thereto, but the user is provided with the ability at page 232 to deselect this feature. If the user decides to maintain this feature activated, the trim values may be adjusted. For example, the Accelerator Maximum Vehicle Speed trim is indicated as being set at its default value, but the user has the option to modify (increase or decrease) the default value of 62 mph at window 236. Likewise, the user may modify the Accelerator Lower Droop value at window 238 and the Accelerator Upper Droop value at window 238. Finally, the user may disable at page 232 the enabled Smart Road Speed Governor feature. The user may then return to page 230 by selecting the Back icon or continue reviewing the remaining trim values forming the fuel economy feature by selecting appropriate features in the Fuel Economy list 234 at the left side of page 232.

At any time after page 222, or after the user has modified desired ones of the features and/or trims as described by example with reference to FIGS. 4G and 4H, the user may select the Summary icon in option list 226. In this example, the user has done so at page 232, and the calibration web site responds by presenting page 242 of FIG. 4I. The summary page 242 presents the user with all recommended and modified features and/or trim values for review. When the user is satisfied with the set of features and/or trim values, the Download icon may be selected from the option list 226. In the example shown, the user has selected the Download option at page 242, and the calibration web site responds by advancing to page 244 of FIG. 4J.

Figure 4J:
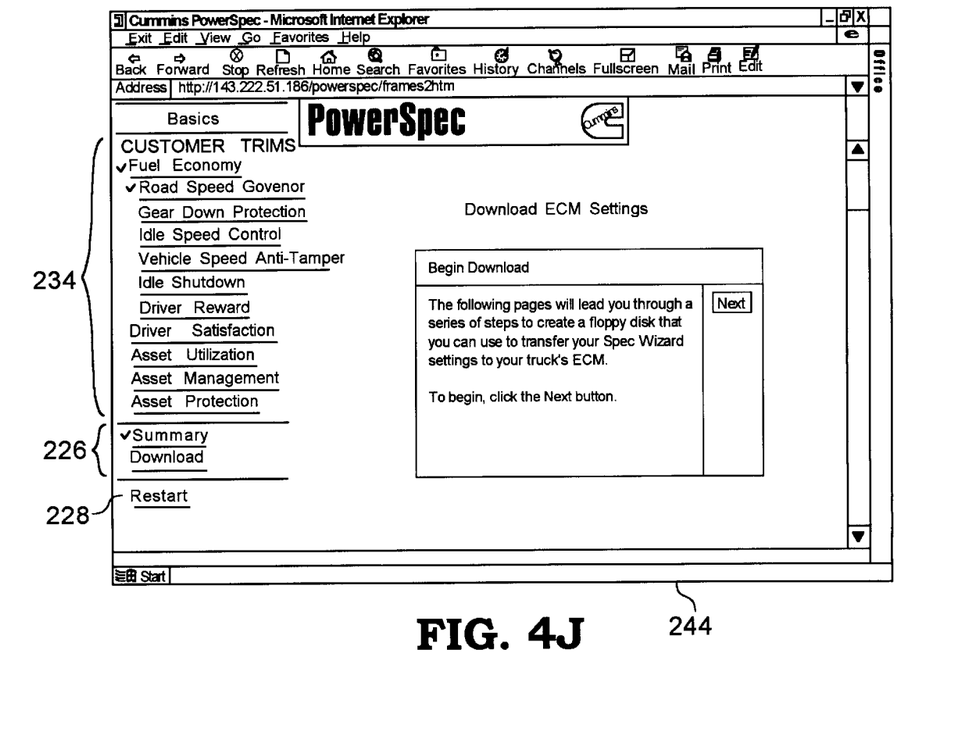
Figure 4K:
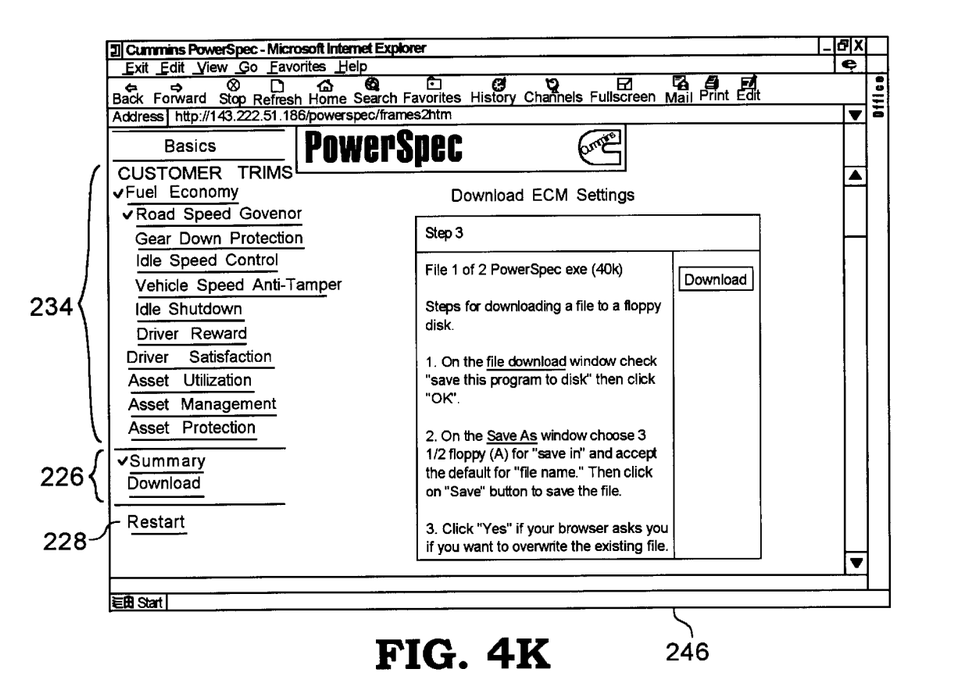
Figure 4L:
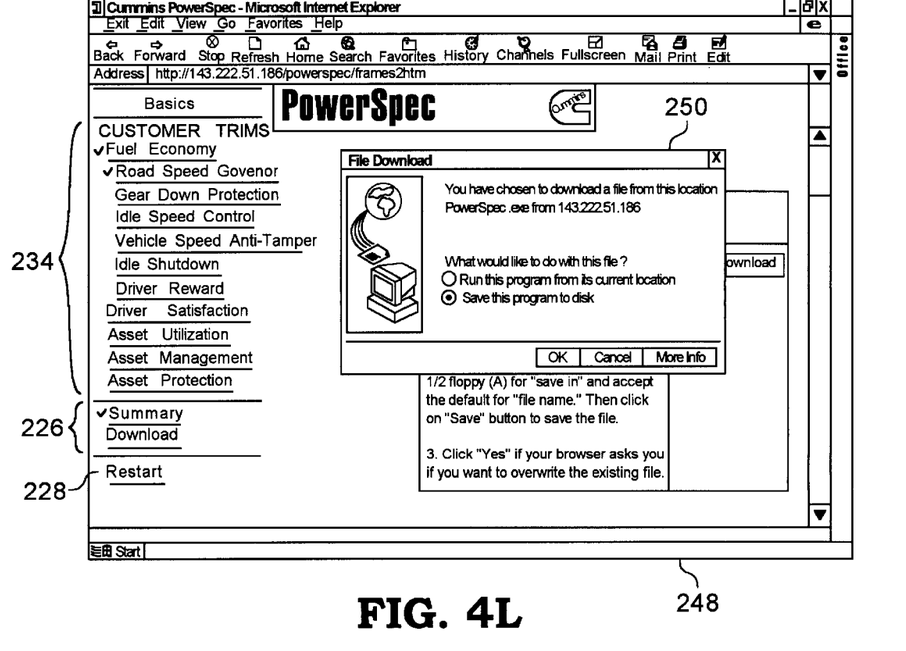
Figure 4M:
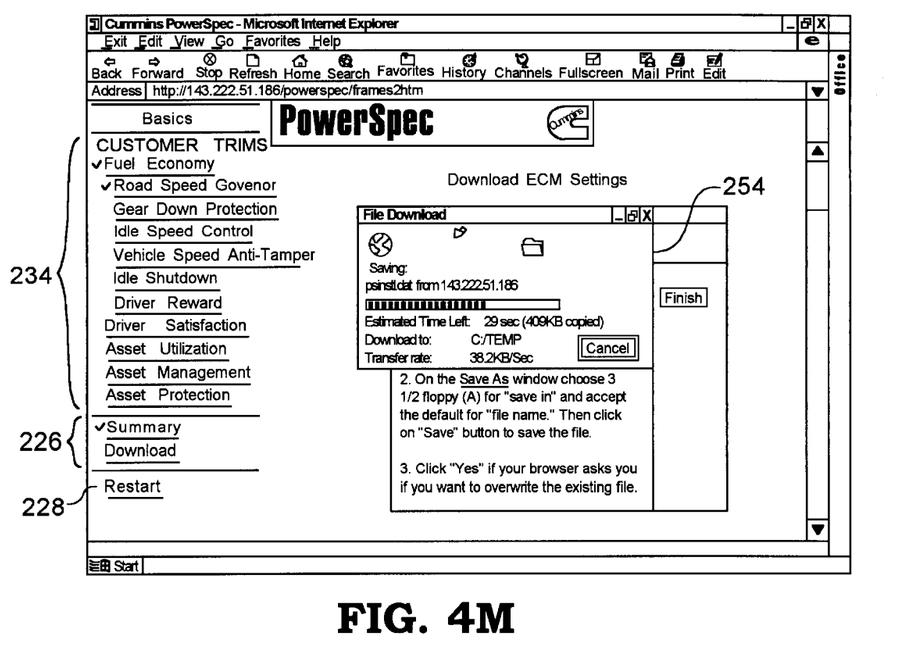

At page 244, the calibration web site instructs the user that a file of the final set of features and/or trim values, which incorporates any modifications made to the recommended set of features and/or trim values, will be downloaded from computer 20 to a floppy disk. Alternatively, window 244 may be configured to download the file to another storage area or medium such as, for example, a hard drive of computer 12 or 30 as described hereinabove. Also as described hereinabove, computer 20 is preferably operable to download a loading program along with the file of the final set of features and/or trim values. In any case, window 244 advances to window 246 of FIG. 4K where the user is instructed how and where to download the file. Thereafter at window 248 of FIG. 4L, the user is provided with an option 250 to run the loading program (to transfer the file of the final set of features and/or trim values to the vehicle control computer) from its current location or to save it to disk. In the example shown, the user has chosen to save the file to disk, whereby the calibration web site advances to window 252 and displays information relating to the downloading of the file of the final set of features and/or trim values.

Once the file of the final set of features and/or trim values has been downloaded, preferably including a loading program, the user may load the file into the vehicle control computer 44 according to the loading program as described hereinabove. Preferably, the loading program includes a conventional window-based instruction set to guide the user through the loading process that is easy to learn and to use. Also, a printout is preferably provided as an indication of the features and/or trim values modified. The loading program also preferably includes a so-called "undo" function that allows the user to un-load the file of features and/or trim values and thereby restore the vehicle control computer to its state prior to loading the file thereon. Also, the user may keep the disk or file and loading program combination, and may therefore "undo" the file loading process of the present invention at any time prior any subsequent file modification.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. A method of programming a vehicle control computer, comprising the steps of:

accessing a web site containing vehicle control computer calibration information;

generating a set of vehicle control computer data from the vehicle control computer calibration information based on user input to said web site; and loading said set of vehicle control computer data into a vehicle control computer carried by a vehicle.

2. The method of claim 1 further including the step of providing the web site with information relating to a type of internal combustion engine carried by the vehicle, said user input to the web site including said information relating to a type of internal combustion engine carried by the vehicle.

3. The method of claim 2 further including the step of providing the web site with information relating to a vehicular application of internal combustion engine, said user input to the web site including said information relating to a vehicular application of internal combustion engine.

4. The method of claim 2 further including the step of providing the web site with information relating to a desired performance level of the engine, said user input to the web site including said information relating to a desired performance level of the engine.

5. The method of claim 1 wherein the generating step includes the steps of:

generating a recommended set of vehicle control computer data from the vehicle control computer calibration information based on user input to said web site;

modifying at least some of said recommended set of vehicle control computer data; and generating said set of vehicle control computer data based on said recommended set of vehicle control computer data modified according to the modifying step.

6. The method of claim 1 further including the step of creating a file of said set of vehicle control computer data;

and wherein the load step includes loading said file of said set of vehicle control computer data into the vehicle control computer.

7. The method of claim 6 wherein the creating step further includes creating a loading program corresponding to said file;

and wherein the loading step includes loading said file of said set of vehicle control computer data into the vehicle control computer according to said loading program.

8. A method of programming a vehicle control computer, comprising the steps of:

providing a web site containing vehicle control computer calibration information;

creating a file of vehicle control computer data based on at least some of said vehicle control computer calibration information contained in said web site; and loading said file of vehicle control computer data into a vehicle control computer carried by a vehicle.

9. The method of claim 8 further including the step of accessing the web site;

and wherein the creating step includes creating a file of vehicle control computer data based on at least some of said vehicle control computer calibration information contained in said web site and on user input to said web site.

10. The method of claim 9 further including the step of providing the web site with information relating to a type of internal combustion engine carried by the vehicle, said user input to the web site including said information relating to a type of internal combustion engine carried by the vehicle.

11. The method of claim 10 further including the step of providing the web site with information relating to a vehicular application of internal combustion engine, said user input to the web site including said information relating to a vehicular application of internal combustion engine.

12. The method of claim 10 further including the step of providing the web site with information relating to a desired performance level of the engine, said user input to the web site including said information relating to a desired performance level of the engine.

13. The method of claim 8 further including the steps of:
generating a recommended set of vehicle control computer data from the vehicle control computer calibration information based on user input to said web site; and
modifying at least some of said recommended set of vehicle control computer data;
and wherein the creating step includes creating said file based on said recommended set of vehicle control computer data modified according to the modifying step.

14. The method of claim 8 wherein the creating step further includes creating a loading program corresponding to said file;
and wherein the loading step includes loading said file into the vehicle control computer according to said loading program.

15. A system for programming a vehicle control computer, comprising:
a web site containing vehicle control computer information;
a first computer including means for accessing said web site;
a medium for storing vehicle control computer data;
wherein said first computer is operable to access said web site and download a set of said vehicle control computer data from said web site to said medium, said set of vehicle control computer data based on at least some of said vehicle control computer information contained in said web site and on user information provided thereto; and
means for loading said set of vehicle control computer data from said medium to a vehicle control computer.

16. The system of claim 15 further including means for establishing electronic communications between said means for loading said set of vehicle control computer data from said medium to a vehicle control computer and said vehicle control computer.

17. The system of claim 15 wherein said medium is a memory disk;
and wherein said means for loading said set of vehicle control computer data from said medium to a vehicle control computer includes a second computer operable to transfer said set of vehicle control computer data from said memory disk to said vehicle control computer.

18. The system of claim 15 wherein said medium is a memory unit internal to a second computer;
and wherein said means for loading said set of vehicle control computer data from said medium to a vehicle control computer includes said second computer operable to transfer said set of vehicle control computer data from said memory unit to said vehicle control computer.

19. The system of claim 15 further including a serial data link connected to said vehicle control computer;
and wherein said means for loading said set of vehicle control computer data from said medium to a vehicle control computer includes means for transferring said set of vehicle control computer data to said vehicle control computer via said serial data link.

20. The system of claim 19 wherein said serial data link is one of a SAE J-1587 and a SAE J-1939 data link.

* * * * *